United States Patent [19]

Yamamoto et al.

[11] 4,419,695

[45] Dec. 6, 1983

[54] TELEVISION SOUND RECEIVER

[75] Inventors: Yoshihiro Yamamoto, Tokyo; Masayuki Hongu, Kawasaki; Shigeru Ohmuro, Tokyo; Hiromi Kawakami, Yokohama, all of Japan

[73] Assignee: Sony Corporation, Tokyo, Japan

[21] Appl. No.: 341,465

[22] Filed: Jan. 21, 1982

[30] Foreign Application Priority Data

Jan. 29, 1981 [JP] Japan .................................. 56-12564

[51] Int. Cl.³ ............................................. H04N 5/60
[52] U.S. Cl. ...................................... 358/198; 358/197
[58] Field of Search ................................ 358/197, 198

[56] References Cited

U.S. PATENT DOCUMENTS

4,139,866 2/1979 Wegner ............................... 358/198
4,272,788 6/1981 Ogita .................................... 358/198
4,356,510 10/1982 Nakayama ........................... 358/198

Primary Examiner—Michael A. Masinick
Attorney, Agent, or Firm—Lewis H. Eslinger; Alvin Sinderbrand

[57] ABSTRACT

A television sound receiver having an input terminal for receiving a television sound signal, a tuner including a local oscillator connected to the input terminal, an intercarrier sound demodulating circuit connected to the tuner, a split-carrier sound demodulating circuit, including a limiter amplifier connected to the tuner, a sound signal output terminal, and a switching device for selectively and operatively connecting either the intercarrier or split-carrier sound demodulating circuits between the tuner and the sound signal output terminal. Additionally, the receiver includes an error detecting device connected to the split-carrier sound demodulating circuit for detecting the frequency error of the local oscillator and a first operational device which is responsive to an output signal from the error detecting device and which produces a first operational device output signal which activates the switching device such that the split-carrier sound demodulating circuit is operatively connected between the tuner and the sound output terminal when the output signal from the error detecting device is less than a predetermined level. Level detectors are connected to the limiter amplifier and detect a level of the split-carrier sound signal. A second operational device, which is responsive to the output signal from the level detectors, produces an output signal which activates the switching device such that the intercarrier sound demodulating circuit is operatively connected between the tuner and the sound output terminal when the output signals from the level detectors are less than a predetermined value.

8 Claims, 11 Drawing Figures

TELEVISION SOUND RECEIVER

BACKGROUND OF THE INVENTION

1. Field of the Invention

This invention relates to a television sound receiver and more particularly to a television sound receiver which improves the tone quality of the television sound signal.

2. Description of the Prior Art

As television multiplexed sound broadcasting becomes more widely used, the tone quality of the television sound signal, which has the been more or less overlooked uptil now, becomes more worthy of notice.

Generally, in receiving and demodulating television sound signals intercarrier and split-carrier sound demodulating systems are typically employed. These systems will be described hereinafter.

Figure 1:
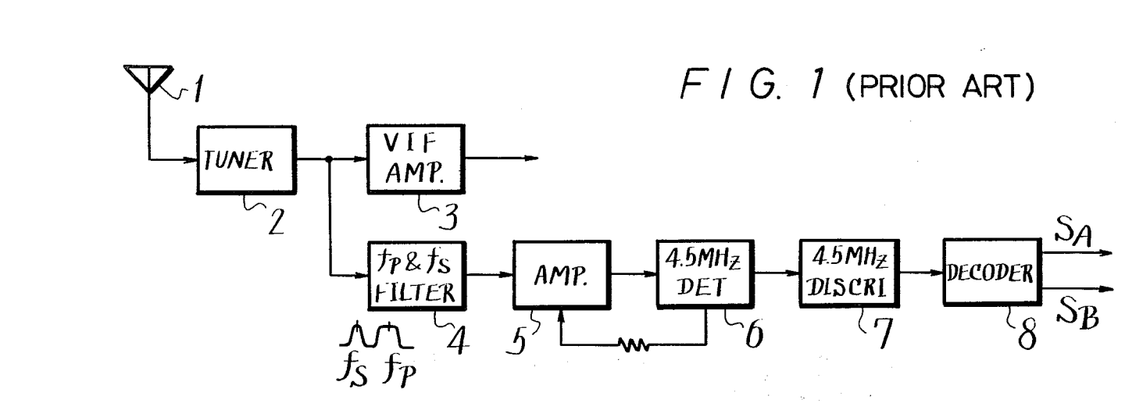
FIG. 1 is a block diagram of a conventional television sound receiver which includes an intercarrier sound demodulating system.

FIG. 1 is a system diagram showing an intercarrier sound demodulating system in which a signal received at an antenna 1 is supplied to a tuner 2 from which an intermediate frequency (IF) signal containing a video carrier component with a frequency $f_p$ of, for example, 58.75 megahertz (MHz) and a sound carrier component with a frequency $f_s$ of, for example, 54.25 MHz are produced. This IF signal is supplied to a video intermediate frequency amplifier 3 as well as to a filter 4 which is provided to extract only the video and sound carrier components. An output signal from filter 4 is supplied through an amplifier 5 to a sound detector 6. Sound detector 6 produces a frequency modulated (FM) sound signal as a beat frequency signal of 4.5 MHz and is equivalent to the difference between the video and sound carrier frequencies. An output signal of sound detector 6 is applied to a frequency discriminator 7, frequency demodulated therein and an output therefrom is supplied to a multiplexed sound signal detector 8. Decoder 8 produces normal monaural sound signals as output signals $S_A$ and $S_B$ when the transmitted television sound is not multiplexed and a left-channel sound signal (one language sound signal) as output signal $S_A$ and a right-channel sound signal (another language sound signal) as output signal $S_B$ when the transmitted television sound is multiplexed such as in stereo sound. One part of the signal derived from sound detector 6 is fed back to amplifier 5 so as to provide an automatic gain control (AGC) thereto.

Figure 2:
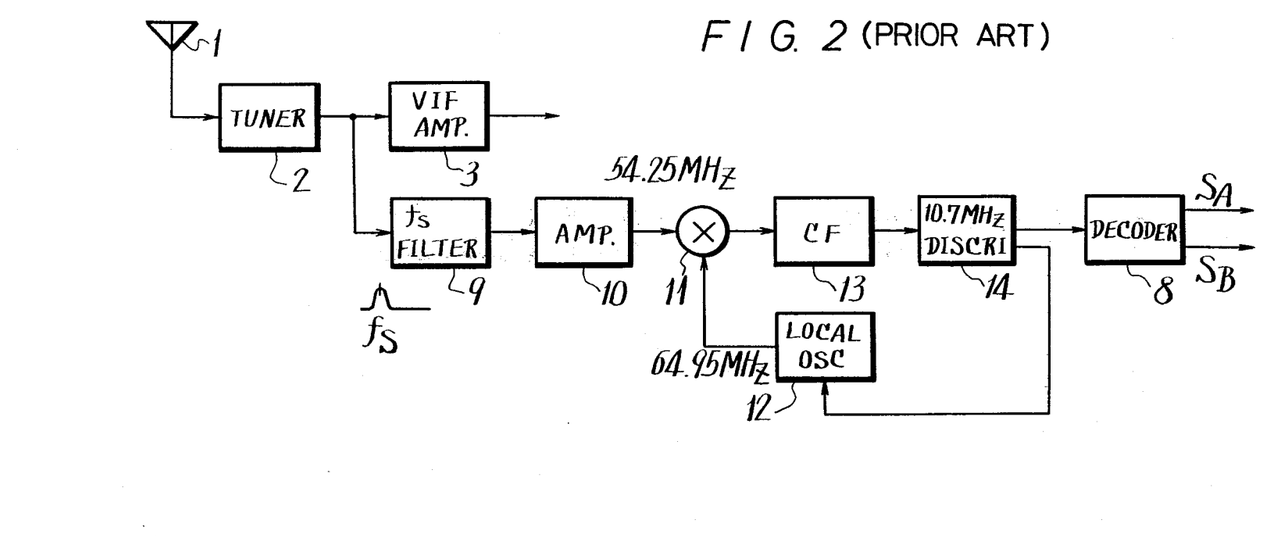
FIG. 2 is a block diagram of a conventional television sound receiver which includes a split-carrier sound demodulating system.

FIG. 2 is a system diagram showing an outline of the split-carrier sound demodulating system wherein an output signal of tuner 2 is supplied to a surface acoustic wave filter 9 having a band pass characteristic such that only the sound carrier component with frequency $f_s$ 54.25 MHz is produced. This sound carrier component is applied through an amplifier 10 to a mixer 11. Additionally a local oscillator 12 is provided which supplies an oscillating signal of 64.95 MHz to mixer 11 and thereby permits the oscillating and sound carrier signals to be multiplexed with each other. Accordingly, mixer 11 produces an output signal equal to a frequency difference between the sound carrier component and the oscillating signal of 10.7 MHz. The mixer output signal is supplied via a ceramic filter 13 to and demodulated at a frequency discriminator 14 which produces an output signal that is supplied to multiplexed sound signal decoder 8 and thereby produces the same output signals $S_A$ and $S_B$ as shown in FIG. 1.

The output signal of frequency discriminator 14 is supplied to local oscillator 12, forming an automatic frequency control (AFC) loop, to control the local oscillating frequency of local oscillator 12.

Since the aforementioned intercarrier sound demodulating system utilizes a frequency component of 4.5 MHz, which is the difference between the video and sound carrier component, the intercarrier sound demodulating system has an inherent drawback in that the video carrier component is apt to be mixed with the sound channel resulting in interference such as buzz noise.

In monaural sound broadcasting when the transmitted sound signal is not multiplexed, a high band component of the sound signal is deemphasized by a deemphasis circuit of a sound FM signal wave detector resulting in a somewhat acceptable level of buzz noise. In contrast thereto, when the sound signal is multiplexed, as in the present invention, the tone quality of the television sound is significantly and undesirably influenced by the buzz noise interference since it is necessary to extract a sub-channel sound signal before the entire sound signal is deemphasized by the deemphasis circuit.

During operation of the split-carrier sound demodulating system, the sound and video carrier components are separated from each other. Thus the sound carrier component is never influenced by the video signal component and hence the sound signal reproduced by the receiver has a good tone quality.

There are, however, drawbacks in using a split-carrier sound demodulating system. For example, since the sound and video carriers are adapted to be processed independently of each other in the split-carrier sound demodulating system, when the local tuner oscillating frequency is deviated and if the AFC is unlocked, due to, for example, changing the tuning frequency of tuner 2, the television sound signal can be lost even though the picture is still being reproduced on the screen of the receiver. Of course, the loss of a sound signal may not be readily noticed by viewers in general if the television receiver comprises only a video monitor having no sound reproducing apparatus or the demodulating decoder of the multiplexed sound signal is physically separated and located far from the television screen. But, when both the television receiver and demodulating decoder are integrally constructed and if only the picture and not the sound signal is reproduced, a viewer may not understand what has happened and may become puzzled or confused over the loss of the sound signal.

In contrast thereto, with respect to the intercarrier sound demodulating system, since the frequency difference between the video and sound carriers is utilized, the picture and sound signals of the television receiver will always be synchronized with each other such that the sound signal can never be lost while the picture signal is reproduced.

Additionally, although in receiving a very high frequency (VHF) signal, no buzz or buzz beat noise occurs in the split-carrier sound demodulating system such that the tone quality of a reproduced sound signal is satisfactory, when receiving an ultra high frequency (UHF) signal, the sound signal tone quality can become unacceptable. In fact, when receiving UHF signals, the split-carrier sound demodulating system can produce an inferior tone quality to that of the intercarrier sound demodulating system.

For example, in Japan, the local oscillating frequency in the tuner is 58.75 MHz higher than a received signal frequency. If a received signal, i.e., an input signal, has a low level, the local oscillator of the tuner can stably or positively oscillate at a predetermined local oscillating frequency. If the input signal level becomes high, however, a disturbing wave is superimposed upon a frequency determining element such as a variable capacitor of the tuner local oscillator which results in the local oscillating frequency being forcibly shifted. That is, due to the influence of the high level of the video carrier, a so-called "pull-in" operation of the tuner local oscillator occurs. It should be noted that the AGC is applied to the tuner in order to secure an acceptable S/N (Sound to Noise) ratio of the picture for both VHF and UHF input signals whenever the input signal level is 65 dBμ or more. Thus when an input signal is at or above 65 dBu, the AGC will suppress and thereby significantly minimize the aforementioned pull-in operation of the tuner local oscillator. However, when the input signal is below 65 dBu, the AGC is inoperative. Thus for input signal levels just below 65 dBu, the pull-in operation can occur without being suppressed by the AGC. In such instances, if the input signal is at an ultra high rather than very high frequency, the frequency determining element, such as the variable capacitor, will be more sensitive to the high level of the input signal resulting in much greater frequency fluctuation of the oscillator output signal and creating appreciable buzz noise interference. For example, the sensitivity of a variable capacitor at an ultra high as compared to a very high frequency can be raised by a factor of four. Therefore, in case of the UHF, if the pull-in operation, as set forth above, occurs at an input signal level of about 50 to 60 dBμ which, can not be suppressed by the AGC, the tuner local oscillating frequency will change in accordance with the input signal level. In a television receiver, since the video carrier is amplitude modulated (AM), the tuner local oscillating frequency fluctuates in response to the level of the video carrier. Thus in the split-carrier sound demodulating system, when fluctuations in the tuner local oscillating frequency occur due to fluctuations, in a UHF video carrier, the sound signal fluctuates and becomes buzz noise.

The degree of tone quality deterioration, due to buzz noise, becomes rapidly worsens when the AGC is ineffective in the case of a UHF signal. After the buzz noise is detected and if the input signal level is further raised by about 5 dB, the tone quality deterioration becomes even more severe as compared with the tone quality of the intercarrier sound demodulating system.

To prevent such deterioration, the AGC of the UHF tuner must be arranged such that the AGC becomes effective when the input signal level is still 50 to 60 dBμ. However, by lowering the threshold level which activates the AGC, the S/N ratio of the picture will deteriorate, as set forth above, and becomes unsuitable for practice. To prevent such S/N deterioration, a buffer amplifier inserted between the local oscillator of the UHF tuner and the mixer has been considered. However, it is quite difficult to design a buffer amplifier which is capable of covering the entire UHF range. Furthermore even if such a design were possible, it would be quite difficult to produce such an amplifier at an attractive manufacturing cost.

An additional problem arises in the split-carrier sound demodulating system due to amplitude to phase modulation (AM-PM) coversion prior to transmission of a signal. More specifically, since the video carrier as well as the sound carrier are modulated for phase in satellite multiple relaying broadcasting, in the intercarrier sound demodulating system, the phase modulated amount is cancelled whereby no buzz noise occurs. But, in the split-carrier sound demodulating system, since the sound carrier component modulated for phase is separated from the video carrier component reproduced as it is demodulated, the phase modulated amount is not eliminated so that buzz noise occurs.

Thus, as described above, neither the split-carrier nor the intercarrier sound demodulating system is always suitable in improving the tone quality of the television sound signal and each system has various defects.

Figure 3:
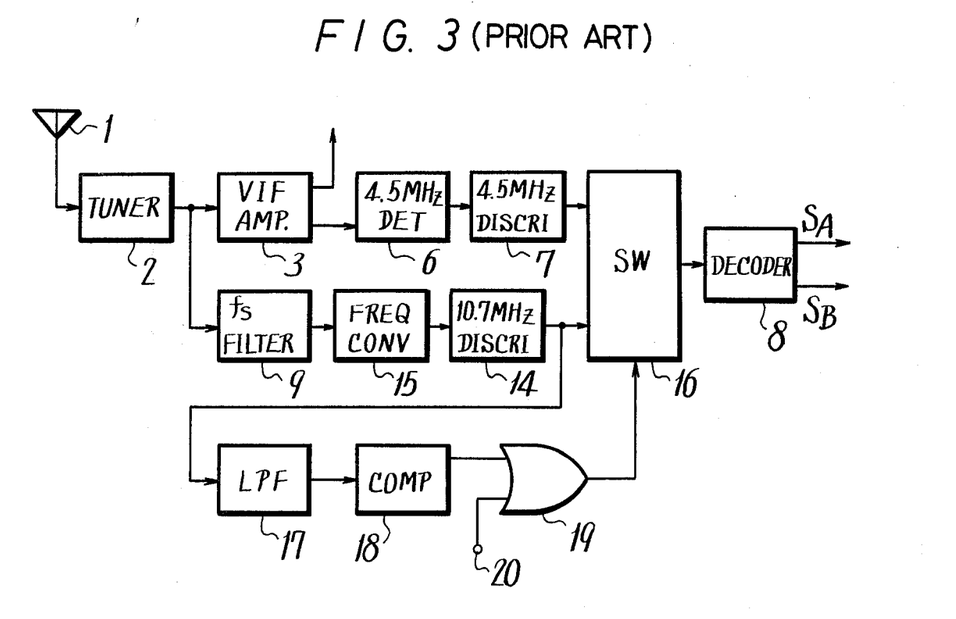
FIG. 3 is a block diagram of a conventional television sound receiver which includes both intercarrier and split-carrier sound demodulating systems.

In order to take advantage of the best aspects from both systems a television receiver, as shown in FIG. 3, which includes a multiplexed sound signal decoder can be used.

In FIG. 3, a television sound receiver is provided which includes both intercarrier and split-carrier sound demodulating circuits and is designed to select the demodulated output signal produced from either circuit.

The intercarrier sound demodulating circuit is supplied by an output signal derived from tuner 2 which applied to video intermediate frequency amplifier 3. An output signal from the video intermediate frequency amplifier 3 is delivered to a video detector circuit (not shown) as well as sound demodulating circuit 6. The frequency modulated sound signal derived from sound demodulating circuit 6 is supplied to and frequency-demodulated by frequency discriminator 7, which provides an output signal that is delivered to a signal switching circuit 16.

The split-carrier sound demodulating circuit also supplied by the output signal derived from tuner 2 which is applied to surface acoustic filter 9. An output signal from filter 9, which contains the sound carrier component only, is applied and converted to a sound carrier signal having a frequency of 10.7 MHz by a frequency converter or converting circuit 15. An output signal from frequency converter 15 is supplied to and demodulated at a frequency discriminator or discriminating circuit 14. The demodulated output therefrom is supplied to signal switching circuit 16 which selectively switches from the demodulated output signal supplied by frequency discriminator 7 to the demodulated output signal supplied by frequency discriminator 14 such that the output signal from frequency discriminator 14 is delivered to multiplexed sound signal decoder 8.

A control circuit for switchably controlling signal switching circuit 16 includes a low pass filter 17 and comparator 18. The output signal from the frequency discriminator 14 is supplied to low pass filter 17 which produces an S-shaped output signal (refer to FIG. 4) and which is delivered to comparator or comparing circuit 18.

When the receiving condition is not acceptable and the frequency of the local oscillator (not shown), which is included in tuner 2, is altered by, for example, ±250 kHz or more due to, for example, fine turning of tuner 2, comparator 18 produces, for example, a detecting high level output signal "1". The detected output signal "1" is supplied to signal switching circuit 16 as the control signal through an OR circuit 19 so that signal switching circuit 16 is switched to supply the demodulated output delivered from frequency discriminator 7 in the intercarrier sound demodulating circuit to multiplexed sound signal decoder 8.

When the receiving condition is satisfactory, however, comparator 18 does not produce the detecting output "1" so that signal switching circuit 16 is switched to the demodulated output derived from frequency discriminator 14 of the split-carrier sound demodulating circuit which is delivered to multiplexed sound signal decoder 8.

Accordingly, since comparator 18 does not produce the detecting output "1" under normally satisfactory receiving conditions, the demodulated output signal provided by the split-carrier sound demodulating circuit is supplied to multiplexed sound signal decoder 8 and thereby reproduces a television sound signal with good tone quality and no buzz noise interference.

When the frequency error of the local oscillator included in tuner 2 reaches or becomes greater than a predetermined value and when fine tuning or other tuning is performed at tuner 2, such that the AGC is unlocked, the comparator 18 produces detecting output "1" resulting in the output signal produced by the intercarrier sound demodulating circuit delivered to multiplexed sound signal decoder 8. Thus, the receiver, as shown in FIG. 3, will never allow the sound signal to be lost while the picture is reproduced on the picture screen.

Additionally, a forced change-over switch (not shown) can be included in the receiver to force the signal switching circuit 16 to switch from the split-carrier sound demodulating circuit to the intercarrier sound demodulating circuit. For example, when a UHF signal is received by antenna 1 and when the buzz noise is remarkable in the reproduced or outputted sound, through a terminal 20 a forced intercarrier switching control signal having the same high level as the detecting output "1" derived from comparator 18, is supplied through a terminal 20 to signal switching circuit 16 via OR circuit 19 and thereby forces the receiver to switch from the split-carrier sound demodulating circuit to the intercarrier sound demodulating circuit. Therefore, the previously mentioned drawbacks caused by employing only the split-carrier sound demodulating circuit are avoided.

Figure 4:
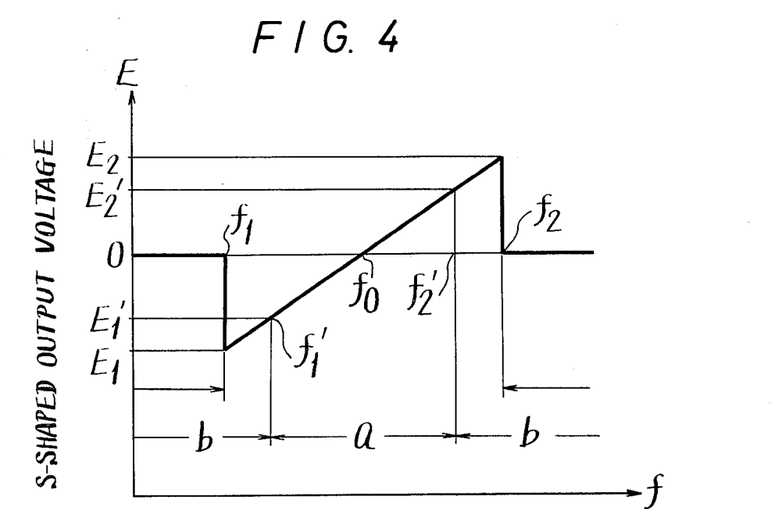
FIG. 4 is a graph of a frequency characteristic curve illustrating the operation of a low pass filter as shown in FIG. 3.

The television sound receiver as described above, with reference to FIG. 3, however, has the following inherent problem: Due to the characteristic of frequency discriminator 14, an output voltage E produced from low pass filter 17 provides an S-shaped characteristic as illustrated in FIG. 4. The output voltage E of low pass filter 17 varies in accordance with the change of an input signal frequency f applied to filter 17. More specifically, as shown in FIG. 4, character $f_0$ represents a tuning frequency of frequency discriminator 14 wherein when $f=f_0$, $E=0$. When the $f_1 \leq f \leq f_2$, E and f form a linear relationship and when $f<f_1$ and $f<f_2$, $E=0$. Output voltage E is equal to $E_1$ and $E_2$ when f is equal to $f_1$ and $f_2$, respectively. Also, $f_1'$ and $f_2'$ are respectively selected such that $f_1<f_1'<f_0$, $f_0<f_2'<f_2$ and $f_2'-f_0=f_0-f_1'$. The corresponding values of E when $f=f_1'$ and $f=f_2'$ are $E=E_1'$ and $E=E_2'$, respectively. Furthermore, when the local oscillator included within tuner 2, as set forth above, is deviated by ±250 kHz or more, tuning frequency is f is equal to $f_2'$ and $f_1'$, respectively.

In comparator 18, voltages $E_1'$ and $E_2'$ are predetermined reference voltages such that when E satisfies the conditions $E_1' \leq E \leq E_2'$, in other words, when f is within a range of $f_1' \leq f \leq f_2'$ shown by reference letter a in FIG. 4, the detecting signal becomes "0" as mentioned above. Thus, signal switching circuit 16 is switched to supply the demodulated output signal derived from the split-carrier sound demodulating circuit to multiplexed sound decoder 8.

Additionally, when E is less than $E_1'$ or greater than $E_2'$, that is, when $E<E_1'$ or $E>E_2'$, tuning frequency f is less than $f_1'$ or greater than $f_2'$, that is, $f<f_1'$ or $f>f_2'$, respectively, as shown by letter b in FIG. 4. In particularly, for those values of frequency f where $f_1 \leq f<f_1'$ or $f_2'<f \leq f_2$ the detecting signal becomes "1" as described above. Thus signal switching circuit 16 is switched to supply the demodulated output signal from the intercarrier sound demodulating circuit to multiplexed sound signal decoder 8.

However, when large deviations occur in the local oscillating frequency of the local oscillator included within tuner 2, tuning frequency f contained in the input signal applied to frequency discriminator 14 becomes greater than $f_2$ or less than $f_1$, that is, $f>f_2$ and $f<f_1$ and $E=0$. Therefore, the value of E ($E=0$) is the same as when $f=f_0$. Thus, the detecting signal becomes "0" instead of "1" and thereby causes misoperation of signal switching circuit 16 resulting in the demodulated output signal delivered from the split-carrier sound demodulating circuit rather than from the intercarrier sound demodulating circuit being supplied to multiplexed sound decoder 8.

OBJECTS AND SUMMARY OF THE INVENTION

Accordingly, it is an object of the present invention to provide a television sound receiver which avoids the foregoing disadvantages of the prior art.

More specifically, it is an object of the present invention to provide a television sound receiver which improves a tone quality of the reproduced television sound signal.

It is another object of this invention to provide a television sound receiver which demodulates a television sound signal using an intercarrier sound demodulating circuit when large frequency deviations occur in the local oscillator of the tuner.

According to an aspect of the present invention, a television sound receiver has an input terminal for receiving a television sound signal, a tuner, including a local oscillator, connected to the input terminal, an intercarrier sound demodulating circuit connected to the tuner, a split-carrier sound demodulating circuit, including a limiter amplifier, connected to the tuner, a sound signal output terminal, and a switching device for selectively and operatively connecting one of the intercarrier or split-carrier sound demodulating circuits between the tuner and the sound signal output terminal. Additionally, the receiver includes an error detecting device connected to the split-carrier sound demodulating circuit for detecting frequency error of the tuner local oscillator and a first operational device which is responsive to the output signal from the error detecting device and provides a first operational device output signal which activates the switching device such that the split-carrier sound demodulating circuit is operatively connected between the tuner and the sound signal output terminal when the output signal of the error detecting device is less than a predetermined level. Furthermore, level detectors, which are connected to the limiter amplifier, detect a level of the split-carrier sound signal and a second operational device, which is responsive to the output signal from the level detectors, produces an output signal which activates the switching means such that the intercarrier sound demodulating circuit is operatively connected between the tuner and the sound signal output terminal when the output signal from the level detectors is less than a predetermined value.

The above, and other objects, features and advantages of the present invention will become apparent from the following detailed description which is to be read in conjunction with the accompanying drawings in which the like references designate the same elements and parts.

DESCRIPTION OF THE PREFERRED EMBODIMENT

Included within a television sound receiver are intercarrier and split-carrier sound demodulating circuits, a switch for selecting a demodulated output signal from either of the sound demodulating circuits and a frequency discriminator which detects a shift or error in frequency produced by a local oscillator included within a tuner. The switch is controlled, in part by sampling an output signal from the frequency discriminator. Normally the split-carrier sound demodulating circuit is selected by the switch. However, when the frequency of the tuner local oscillator is outside of a predetermined frequency range, the demodulated output signal from the intercarrier sound demodulating circuit is selected by the switch. Additionally, when the output signals from one or more level detectors, which detect a level of a sound carrier signal produced by a limiter amplifier included in the split-carrier sound demodulating circuit, is below a predetermined amplitude the switch selects the demodulated output signal from the intercarrier sound demodulating circuit.

Figure 5:
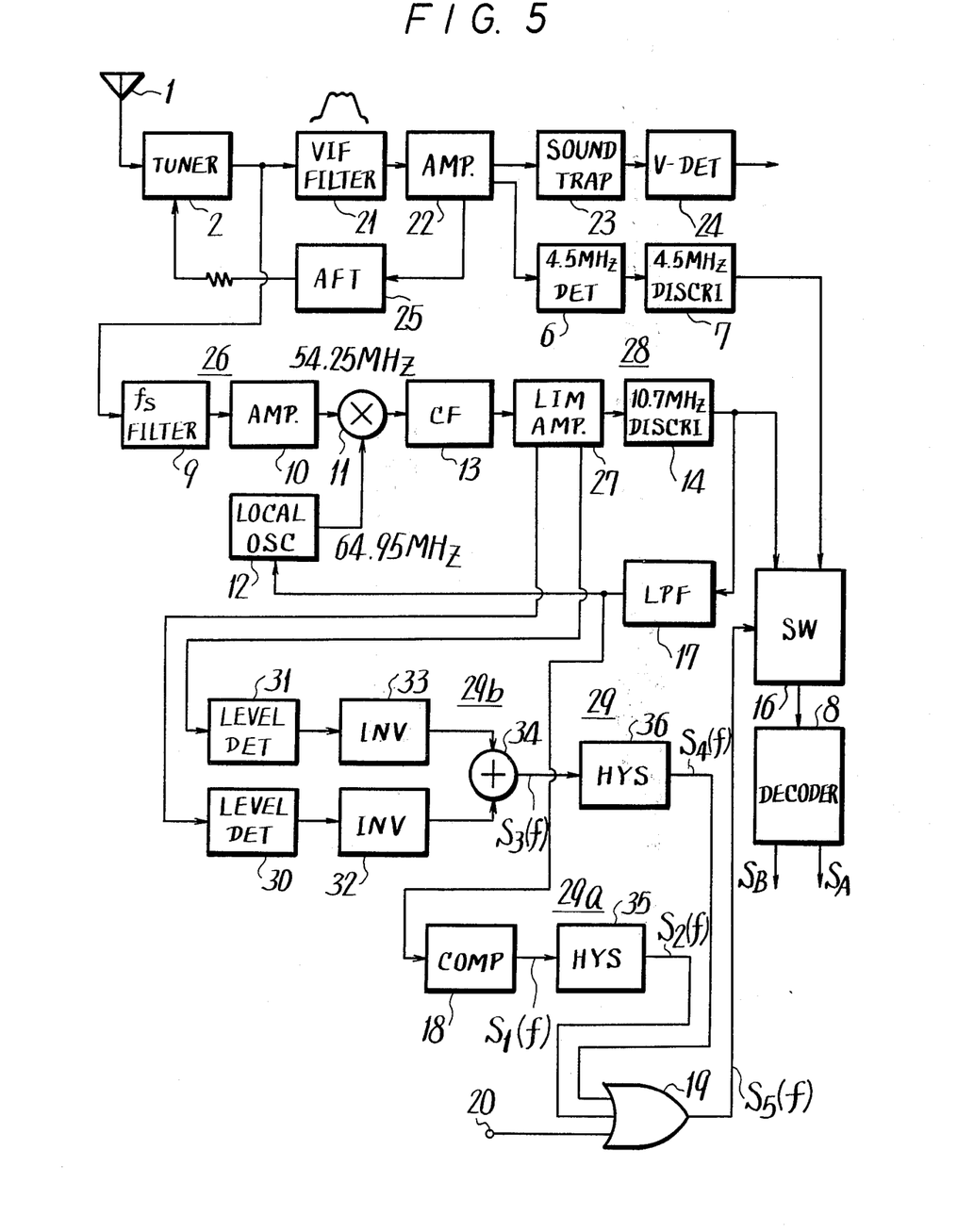
FIG. 5 is a schematic block diagram showing a television sound receiver in accordance with an embodiment of the present invention.

With reference to FIG. 5, which illustrates one embodiment of the television sound receiver according to the present invention, like parts corresponding to those shown in FIGS. 1 to 3 are marked with the same references and description thereof will be partially omitted.

In the embodiment schematically shown in FIG. 5, the output signal from tuner 2 is supplied through a surface acoustic filter 21, having a video intermediate frequency selecting characteristic, to an amplifier 22, the output of which is supplied through a sound trap circuit 23 to a video detector or detecting circuit 24 which produces a video detected output. A portion of the output signal derived from amplifier 22 is delivered to an automatic fine tuning (AFT) circuit 25 whereby frequency deviations or errors of a video intermediate frequency (VIF) carrier supplied by tuner 2 are detected and then corrected by the AFT circuit to control the local oscillating frequency of tuner 2.

In FIG. 5, numeral 26 designates the overall arrangement of the split-carrier sound demodulating circuit, wherein the output signal produced from tuner 2 is supplied to surface acoustic filter 9. An output signal of filter 9, which has a sound carrier component with a frequency of 54.25 MHz, is supplied through an amplifier 10 to a mixer or mixing circuit 11.

Additionally, a local oscillator or oscillating circuit 12 produces a local oscillating signal with a frequency of 64.95 MHz, which is delivered to mixer 11. Mixer 11 mixes the signals supplied by amplifier 10 and oscillator 12 and produces an output signal which has a frequency equal to the difference between or sum of both signals supplied thereto. The mixer output signal is supplied to ceramic filter 13 having band pass characteristic, such that, an output signal therefrom has a sound carrier component with a frequency of 10.7 MHz, which represents the frequency difference between the input signals of mixer 11. This sound carrier component is supplied through a limiter amplifier 27, having three stages, to and frequency-demodulated at frequency discriminator 14 whose demodulated output is delivered to switching circuit 16. The output derived from frequency discriminator 14 is also applied to local oscillator 12 through low pass filter 17, so that the oscillating frequency thereof is controlled and thereby maintains a desired mixer output signal frequency.

Numeral 28 denotes an intercarrier sound demodulating circuit in which the output signal from the amplifier 22 is supplied to sound signal detector 6 and from which the sound carrier component with the frequency of 4.5 MHz is derived and then delivered to and demodulated at frequency discriminator 7. The demodulated output therefrom is supplied to switching circuit 16 which, as disclosed previously connects either the intercarrier or split-carrier sound demodulating circuit to decoder 8.

A first control circuit 29a, which corresponds to the control circuit previously described with reference to FIG. 3, is part of a control circuit 29 that controls switching circuit 16. The demodulated output signal generated from frequency discriminator 14 is supplied to low pass filter 17. The S-shaped output signal (refer to FIG. 7A) produced therefrom is delivered to comparator 18. The detected output signal comparator 18 is supplied as the switching control signal to switching circuit 16 through a first hysteresis circuit 35 and OR circuit 19. As disclosed previously, with reference to FIG. 3, OR circuit 19 includes terminal 20 which allows the receiver to be forcibly switched from a split-carrier to intercarrier sound demodulating mode of operation.

In a second control circuit 29b, which is part of control circuit 29, the sound carrier components having a frequency of 10.7 MHz derived from, for example, second and third stages of limiter amplifier 27 are respectively applied to level detectors or detecting circuits 30 and 31. The respective detecting outputs, which are DC voltages, are supplied through inverters, that is, inverting amplifiers 32 and 33 to and added together at a synthesizer or adder 34. The added output (refer to FIG. 7C) therefrom is supplied to switching circuit 16 as another switching control signal via a second hysteresis circuit 36 and OR circuit 19.

Figure 6:
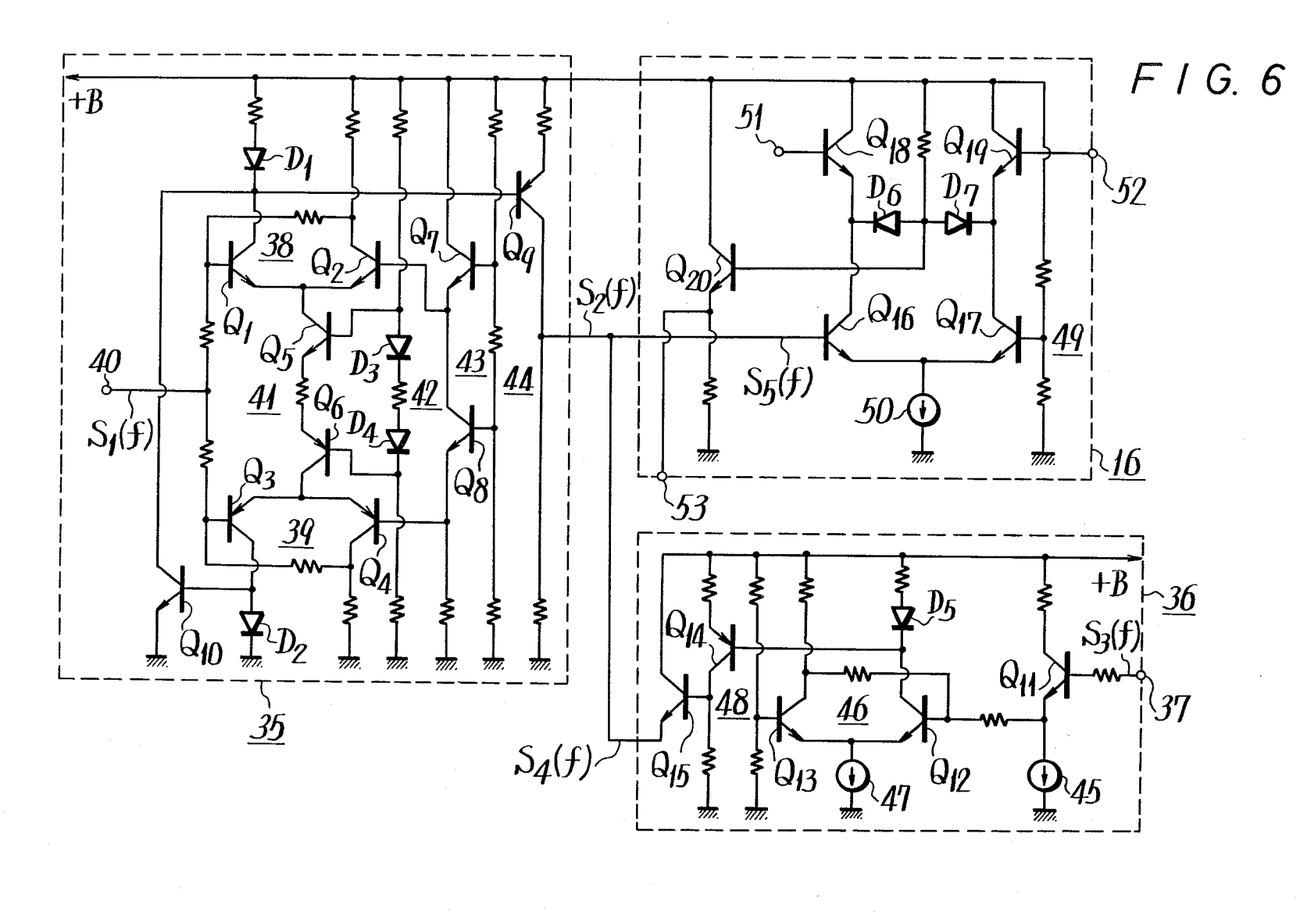
FIG. 6 is a circuit diagram which can be used in one part of the embodiment shown in FIG. 5.

FIG. 6 exemplifies a practical arrangement of circuitry which can be used for first and second hysteresis circuits 35 and 36 and switching circuit 16. More particularly, as shown in FIG. 6, first hysteresis circuit 35 includes reference numerals 38 and 39 each of which denote Schmitt trigger circuits that respectively include differential transistor amplifiers $Q_1$, $Q_2$ and $Q_3$, $Q_4$ each formed of npn-type and pnp-type transistors. Emitters of $Q_1$ and $Q_2$ are coupled to emitters of $Q_3$ and $Q_4$ via a constant current circuit 41. The S-shaped output voltage derived from low pass filter 17 is supplied through an input terminal 40 and resistors to the bases of transistors $Q_1$ and $Q_3$. Reference letter +B denotes a DC voltage supply source.

Constant current circuit 41 includes a serial circuit composing npn-type and pnp-type transistors $Q_5$ and $Q_6$ and a resistor connected to the emitters thereof. Applied to the respective bases of transistors $Q_5$ and $Q_6$ are large and small bias voltages which are delivered from a bias circuit 42. Bias circuit 42 comprises diodes $D_3$ and $D_4$ and a resistor serially connected between $D_3$ and $D_4$. Applied to the bases of transistors $Q_2$ and $Q_4$ are large and small reference voltages, respectively, which are produced from the emitters of transistors $Q_7$ and $Q_8$. Transistors $Q_7$ and $Q_8$, which are both npn-type transistors, form a reference voltage generating circuit 43 and are serially connected. The respective bases of transistors $Q_7$ and $Q_8$ have different bias voltages applied thereto. These bias voltages are derived from a bias circuit 44 comprised of three resistors serially connected.

Connected to the collectors of transistors $Q_1$ and $Q_3$ are the cathode and anode of diodes $D_1$ and $D_2$ respectively. Additionally, coupled to the respective cathode and anode of diodes $D_1$ and $D_2$ are bases of pnp-type and npn-type transistors $Q_9$ and $Q_{10}$, respectively. The collector of transistor $Q_{10}$ is coupled to the base of transistor $Q_9$. Coupled to the collector of transistor $Q_9$ is a load resistor. The output signal derived from the collector of transistor $Q_9$ is supplied to the base of a transistor $Q_{16}$ in switching circuit 16 and serves as a switching control signal.

In second hysteresis circuit 36 numeral 46 denotes a Schmitt trigger circuit including npn-type differential transistor amplifiers $Q_{12}$ and $Q_{13}$ whose respective emitters are coupled to ground through a constant current circuit 47.

Additionally, the base of an npn-type transistor $Q_{11}$ receives the added output from adder 34 through an input terminal 37 and a resistor. The emitter of transistor $Q_{11}$ is coupled both to ground through a constant current circuit (load) 45 and to the base of transistor $Q_{12}$ through a resistor.

A reference voltage derived from a reference voltage circuit 48, formed of a serial circuit comprising two resistors, is applied to the base of transistor $Q_{13}$. The collector of transistor $Q_{12}$ is connected a cathode of diode $D_5$ and the cathode of diode $D_5$ is coupled to a base of a pnp-type transistor $Q_{14}$. The collector of transistor $Q_{14}$ is coupled to a base of a pnp-type transistor $Q_{15}$ and the emitter of transistor $Q_{15}$ is coupled to the base of transistor $Q_{16}$ in switching circuit 16.

Switching circuit 16 includes npn-type differential transistor amplifiers $Q_{16}$ and $Q_{17}$ whose respective emitters are connected to ground through a constant current circuit 50. Connected to the respective collectors of transistors $Q_{16}$ and $Q_{17}$ are emitters of npn-type transistors $Q_{18}$ and $Q_{19}$. Anodes of diodes $D_6$ and $D_7$ are coupled to each other and connected to voltage supply source +B through a resistor. In addition, the respective cathodes of diodes $D_6$ and $D_7$ are coupled to the collectors of transistors $Q_{16}$ and $Q_{17}$. Reference numeral 49 designates a reference voltage circuit comprising the serial circuit composing two resistors. The reference voltage from circuit 49 is delivered to the base of transistor $Q_{17}$.

The collector of transistor $Q_9$ in hysteresis circuit 35 and the emitter of transistor $Q_{15}$ in hysteresis circuit 36 are coupled together and to the base of transistor $Q_{16}$. The respective output signals derived from frequency discriminators 7 and 14 are supplied to input terminals 51 and 52 which are respectively connected to the bases of transistors $Q_{18}$ and $Q_{19}$. $Q_{20}$ designates an npn-type transistor forming an emitter-follower circuit. The base of transistor $Q_{20}$ is connected to the anodes of diodes $D_6$ and $D_7$ and the emitter thereof is connected to an output terminal 53. The output signal from output terminal 53 is delivered to multiplexed sound signal decoder 8.

Figure 7A:
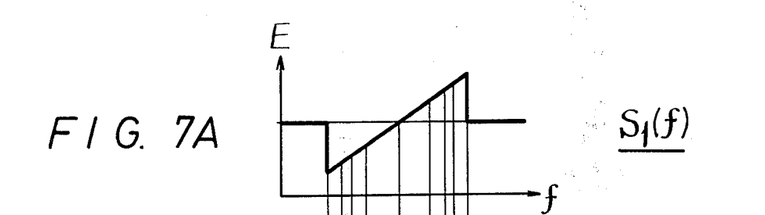
FIGS. 7A to 7E are graphs of frequency characteristic curves illustrating the operation of FIGS. 5 and 6.
Figure 7B:
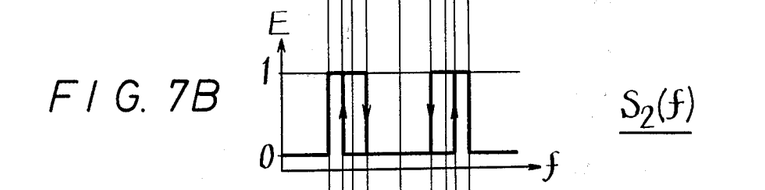
Figure 7C:
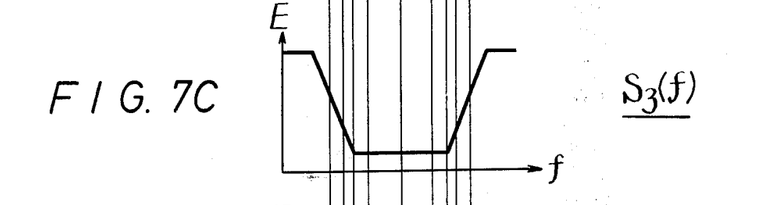
Figure 7D:
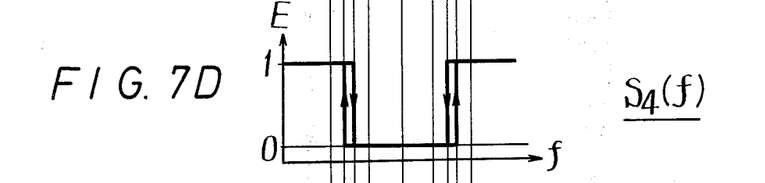
Figure 7E:
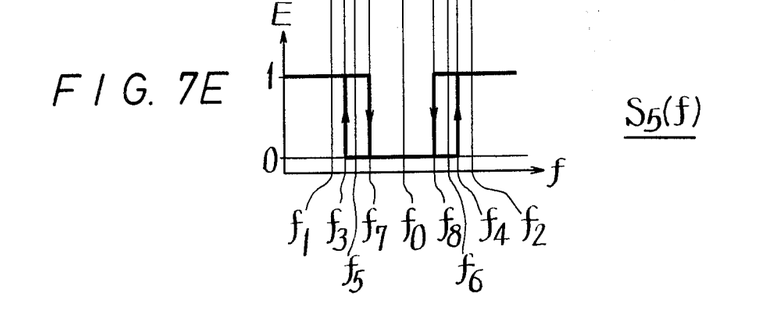

With reference to FIGS. 7A to 7E, the operations of the circuits as seen in FIGS. 5 and 6 will be described next. FIG. 7A is a graph showing the frequency characteristic curve of an S-shaped output voltage $S_1(f)$ supplied to comparator 18. FIG. 7B shows a graph which illustrates the frequency characteristic curve of an output voltage $S_2(f)$ derived from hysteresis circuit 35. FIG. 7C is a graph which shows the frequency characteristic curve of a level detecting voltage $S_3(f)$ supplied to second hysteresis circuit 36. Voltage $S_4(f)$, as shown in FIG. 7D, illustrates a frequency characteristic curve of the output voltage derived from second hysteresis circuit 36. FIG. 7E is a graph which shows the frequency characteristic curve of a switching control signal $S_5(f)$ $\{=S_2(f)+S_4(f)\}$ which is delivered to switching circuit 16.

As illustrated in FIGS. 7A to 7E, letter $f_0$ denotes a center frequency of the tuning circuit in frequency discriminator 14. Letters $f_1$ to $f_8$ each denote frequencies wherein $f_1<f_3<f_5<f_7<f_0<f_8<f_6<f_4<f_2$. Also, frequencies $f_1$, $f_2$; $f_3$, $f_4$; $f_5$, $f_6$ and $f_7$, $f_8$ are respectively symmetrical with respect to center frequency $f_0$.

The input voltage to be applied to comparator 18, namely, the S-shaped output voltage $S_1(f)$ (FIG. 7A) becomes "0" whenever $f<f_1$, $f>f_2$ and $f=f_0$. When $f_1<f<f_2$, the voltage $s_1(f)$ linearly increases in accordance with the increase of f.

In accordance with the increase of f, output voltage $S_2(f)$ (FIG. 7B) from first hysteresis circuit 35 is "0" when $f<f_1$, "1" when $f_1 \leq f<f_7$, "0" when $f_7 \leq f<f_4$, "1" when $f_4 \leq f<f_2$ and "0" when $f_2 \leq f$.

Also, in accordance with the decrease of f, output voltage $S_2(f)$ (FIG. 7B) from first hysteresis circuit 35 is "0" when $f_2<f$, "1" when $f_8<f \leq f_2$, "0" when $f_3<f \leq f_8$, "1" when $f_1<f \leq f_3$ and "0" when $f \leq f_1$.

Input voltage $S_3(f)$ (FIG. 7C) which is applied to second hysteresis circuit 36 has a minimum level (constant value) when $f_5 \leq f \leq f_6$ and a gradually rising level when f is decreased from $f_5$ or increased from $f_6$. That is, $S_3(f)$ has a characteristic curve which resembles the inversion of the band pass characteristic of ceramic filter 13.

Output voltage $S_4(f)$ (FIG. 7D) derived from second hysteresis circuit 36 becomes "1" when $f<f_5$, "0" when $f_5 \leq f<f_4$ and "1" when $f_4 \leq f$ in accordance with the increase of f.

Also, in accordance with the decrease of f, output voltage $S_4(f)$ (FIG. 7D) derived from second hysteresis circuit 36 becomes "1" when $f_6 < f$, "0" when $f_3 < f \leq f_6$ and "1" when $f \leq f_3$, respectively.

Accordingly, in response to the increase of f, switching control signal $S_5(f) \{=S_2(f)+S_4(f)\}$ (FIG. 7E) is "1" when $f < f_7$, "0" when $f_7 \leq f < f_4$ and "1" when $f_4 \leq f$.

Also, in accordance with the decrease of f, switching control signal $S_5(f)$ (FIG. 7E) is "1" when $f_8 < f$, "0" when $f_3 < f \leq f_8$ and "1" when $f < f_3$, respectively.

As described above, when $S_5(f) = $"1", transistor $Q_{16}$ in switching circuit 16 is turned ON, so that the demodulated output signal from frequency discriminator 7 in the intercarrier sound demodulating circuit is delivered to multiplexed sound signal decoder 8. When $S_5(f) = $"0", transistor $Q_{17}$ in the switching circuit 16 is turned ON, so that the demodulated output signal from frequency discriminator 14 in the split-carrier sound demodulating circuit is delivered to multiplexed sound signal decoder 8.

Although not shown in FIG. 6, upon receiving a UHF band broadcasting signal, a switching control signal is supplied to the base of transistor $Q_{16}$ of switching circuit 16 to turn transistor $Q_{16}$ ON.

According to the exemplary embodiment of the present invention, as described above, under normal receiving conditions, the demodulated output signal of split-carrier sound demodulating circuit 26 is supplied to multiplexed sound signal decoder 8 and thereby reproduces a good television sound signal having substantially no buzz noise interference.

However, if the local oscillating frequency is deviated by more than a predetermined value when, for example, fine tuning tuner 2, the demodulated output signal demodulated by intercarrier sound demodulating circuit 28 is supplied to multiplexed sound signal decoder 8, so that the sound signal will not be lost while the picture is reproduced on the television picture screen.

Additionally, the present invention avoids misoperation of the receiver by preventing the split-carrier sound demodulating circuit from being selected when large frequency deviations occur in the local oscillator of tuner 2.

Furthermore, by providing hysteresis circuits 35 and 36 ringing which can occur when selecting either of the demodulated output signals is avoided. Still further, the present invention can include muting circuitry to mute undesired audio signals. For example, switching circuit 16, can be replaced with a selecting means such that the demodulated output signals from the intercarrier and split-carrier sound demodulating circuits are supplied to the selecting means through amplifiers which are respectively provided at the next stages of frequency discriminators 7 and 14 wherein the amplifiers include muting circuitry so as to make the amplifiers inoperative at undesired audio signals.

Having described a specific embodiment of the invention with reference to the accompanying drawings, it is to be understood that the invention is not limited to that precise embodiment, and that many modifications and variations may be effected therein by one skilled in the art without departing from the spirit or scope of the invention which is intended to be defined by the appended claims.

We claim as our invention:
1. A television receiver comprising:
   input terminal means for receiving a modulated television sound signal having a frequency associated therewith;
   tuning means for tuning said receiver to the frequency of said modulated television sound signal and providing a tuned output signal, said tuning means including a first oscillating means for producing an oscillating signal at an oscillating frequency;
   intercarrier sound demodulating means for demodulating said tuned output signal and providing an intercarrier sound demodulating output signal;
   split-carrier sound demodulating means for demodulating said tuned output signal and providing a split-carrier sound demodulating output signal and which includes a limiter amplifier having at least one output signal;
   sound signal output terminal means;
   switching means operable to select from said intercarrier and split-carrier sound demodulating output signals and to supply said selected signal to said sound signal output terminal means;
   error detecting means for detecting frequency error in said oscillating frequency of said first oscillating means and providing an output signal;
   first operational means for operating on said output signal of said error detecting means and providing a first operational output signal which has at least a high level and a low level;
   level detecting means for detecting said at least one output signal of said limiter amplifier and providing a level detected output signal; and
   second operational means for operating on said level detected output signal and providing a second operational output signal which has at least a high level and a low level; whereby said signal selected by said switching means and supplied to said sound signal output terminal means is selected in accordance with the level of said output signal of said first operational means and the level of said output signal of said second operational means.

2. A television receiver as in claim 1; further comprising a multiplexed sound decoder having an input terminal connected to said sound signal output terminal means and a pair of audio output terminals.

3. A television receiver as in claim 1; wherein said intercarried sound demodulating output signal is selected by said switching means and supplied to said sound signal output terminal means when said oscillating frequency of said first oscillating means, which is detected by said error detecting means, is outside of a predetermined frequency range.

4. A television receiver as in claim 1; wherein said level detecting means includes a pair of level detectors having a pair of output signals, respectively, and further wherein said intercarrier sound demodulating output signal is selected by said switching means and supplied to said sound signal output terminal means when said pair of output signals of said level detectors are below a predetermined amplitude.

5. A television receiver as in claim 1; wherein said intercarrier sound demodulating means includes an intercarrier sound detector and a first frequency discriminator and further wherein said split-carrier sound demodulating means further includes a first selective filter which selects a first sound carrier component included within said tuned output signal supplied from said tuning means; an amplifier which amplifies an output signal of said first selective filter; a mixer circuit which mixes, as input signals supplied thereto, signals provided by said amplifier and second oscillating means and produces an output signal which contains at least second and third sound carrier components having frequencies equal to the sum of and difference between the frequencies of said input signals supplied to said mixer circuit, respectively; a second selective filter which produces said third sound carrier component as an output signal; and a second frequency discriminator.

6. A television receiver as in claim 3; wherein said error detecting means includes a low pass filter, which has an output signal and is connected to said second frequency discriminator, and a comparator which is connected to said low pass filter.

7. A television receiver as in claim 6; wherein, in response to said output signal of said low pass filter, said second oscillating means produces one of said input signals supplied to said mixer circuit.

8. A television receiver as in claim 6; wherein said first and second operational means include hysteresis circuits.

* * * * *